Patented Mar. 20, 1951

2,545,597

UNITED STATES PATENT OFFICE 2,545,597

PREPARATION OF ALKYL-NITROARYL ETHERS

Walter R. Ashford and Robert W. Beattie, Guelph, Ontario, Canada, assignors to United States Rubber Company, New York, N. Y., a corporation of New Jersey No Drawing. Application December 4, 1947, Serial No. 789,762

11 Claims. (Cl. 260—612)

This invention relates to the preparation of alkyl-nitroaryl ethers and more particularly to the preparation of o- and p-alkyl-nitrophenyl ethers such as o- and p-ethoxy nitrobenzene and o- and p-methoxy nitrobenzene.

Known methods for the preparation of alkyl-nitroaryl ethers, especially the alkoxy nitrobenzenes such as p-ethoxy nitrobenzene (p-nitrophenetole) suffer from many disadvantages including excessively long reaction times, low productivity, the production of an impure product necessitating complicated and expensive purification, the necessity of using rigid temperature controls, the use of high pressures necessitating expensive equipment and complicating operation, use of excessive quantities of a so-called catalyst, etc.

The principal object of the present invention is to provide a simple and economical method of preparing alkyl-nitroaryl ethers from nitroaryl halides and aliphatic monohydric alcohols. Another object is to provide such a method which is readily adapted to plant operation. Another object is to provide such a method giving a good yield of a pure product in a comparatively short reaction time. Another object is to avoid the use of high operating pressures and to eliminate the need for expensive temperature controls. Numerous other objects will more fully hereinafter appear.

We have found that alkyl-nitroaryl ethers may be made in a highly improved manner by passing a stream of oxygen-containing gas, typically air, into a refluxing reaction mixture comprising essentially a nitroaryl halide, an aliphatic monohydric alcohol, an alkali metal hydroxide and a metallic compound capable of catalyzing the oxidation of acetaldehyde to acetic acid and maintaining a concentration of the alkali metal hydroxide throughout the reaction at a figure of from 0.25 to 1.0 normal with respect to the solvent (the alcohol and any water) present.

By operating in this manner the difficulties with the previous processes of making alkyl-nitroaryl ethers from the nitroaryl halides and the monohydric alcohols in the presence of alkali metal hydroxide are overcome and a simple and economical process is provided which is very suitable for a plant scale operation. The process of our invention gives a better yield of the product due to better utilization of the nitroaryl halide as a result of the prevention of the formation of azoxy compounds and as a result of the minimizing of the reaction of the nitroaryl halide with the alkali to form nitrophenol. The productivity of our process is excellent and the process enables good recovery of the excess alcohol used. The reaction times are short, thereby contributing to a practical process. The maintenance of the reaction mixture at the refluxing point avoids the necessity for expensive temperature controls and their resulting complications. The process uses low pressures, almost invariably atmospheric or substantially atmospheric, which greatly simplifies the operation and the equipment requirements as contrasted with high pressure (autoclavic) processes of the prior art. Another advantage is that in our process only small amounts of catalyst are required in contrast to the large amounts of catalyst used heretofore. In our process the amount of catalyst is so small that it is not necessary to recover it although of course such recovery is not precluded.

Any nitroaryl halide may be employed in the practice of our invention. Either the mono- or the poly-nitroaryl halide may be used. We usually employ a mono-nitrophenyl chloride such as p-chloronitrobenzene or o-chloronitrobenzene. Instead of the chloride we may, though less preferably, employ other halides such as the bromides or iodides. Generally the nitroaryl halide employed has only a single halogen group on the ring and is unsubstituted except for the nitro and halogen groups. Any aliphatic monohydric alcohol may be employed in the practice of our invention, the alcohol being selected so as to give the desired alkoxy group on the aryl nucleus. Preference is given to the lower alcohols, namely those having not more than four carbon atoms per molecule namely methanol, ethanol, n-propyl alcohol, isopropyl alcohol or any of the butyl alcohols. At present the alkyl-nitroaryl ethers of greatest importance commercially are those made from ethyl alcohol and methyl alcohol. The alcohol employed is preferably concentrated, the process of our invention being initiated in the substantial absence of water. It should be understood, of course, that the reaction involved forms water and that this water progressively dilutes the reaction mixture. In order to avoid undue dilution by water which would cause the formation of azoxy compounds, the alcohol in the original reaction mixture should be of at least 80% concentration and preferably at least 85%. In practice we employ as nearly 100% alcohol as is commercially feasible. Thus we employ 95% ethanol because the use of absolute ethanol is not practical. In the case of methanol we generally use from 95% to 100% material. The only water present in the reaction mixture is that introduced by the alcohol and that formed by the reaction. As will appear below, the alcohol is generally used in considerable excess and this prevents the water formed by the reaction from diluting the alcohol in the mixture below 85%.

The use of alcohol in a concentration below 85%, as for example 80% alcohol, slows the rate of conversion and is additionally objectionable for this reason.

The amount of alcohol employed determines the productivity of our process and also the rate at which the alkali metal hydroxide can be added to the reaction mixture without exceeding the 1.0 normal limit set forth above. We have carried out the reaction of the present invention using from 4.5 moles to 45 moles of alcohol per mole of nitroaryl halide. With proper control of the concentration of alkali in the manner described herein the ratio of alcohol to nitroaryl halide can be varied over wide limits. When a ratio of 4.5 moles of alcohol to 1 of nitroaryl halide is employed, the reaction time must be increased somewhat to allow for the addition of all of the alkali to be used at such a rate that its concentration does not increase above 1.0 normal. The preferred amount of alcohol employed in our invention is about 9 moles, i. e. from 8 to 10 moles of alcohol per mole of nitroaryl halide.

The alkali employed in practicing our invention may be any alkali metal hydroxide such as sodium hydroxide, potassium hydroxide or even lithium hydroxide, sodium hydroxide being preferred because of cheapness and availability. The alkali concentration in the reaction mixture is the most important factor in determining whether the product of the reaction will be an azoxy compound or the desired alkyl-nitroaryl ether. Thus in the reaction of p-chloronitrobenzene with ethyl alcohol, the alkali concentration will determine whether p-p'-dichlorazoxybenzene or p-nitrophenetole will be obtained. In practicing our invention the alkali concentration is maintained throughout at from 0.25 to 1.0 normal with respect to the alcohol and any water present in the reaction mixture. The preferred alkali concentration is approximately 0.5 normal i. e. from 0.4 to 0.6 normal.

The maintenance of the alkali concentration within the above limits may be secured by incorporating a portion of the alkali metal hydroxide in the initial reaction mixture, the proportion being such that the original reaction mixture contains alkali within the above limits of concentration, and adding the rest of the alkali gradually during the course of the reaction as it is consumed by the reaction. This gradual addition may be either periodic or continuous, addition at intervals (i. e., portionwise) generally being more convenient.

The total amount of alkali used is preferably substantially in excess of 1 mole of alkali per mole of nitroaryl halide. In fact we have found that use of at least 1.5 moles of alkali metal hydroxide per mole of nitroaryl halide is essential for the conversion of the nitroaryl halide to the desired alkyl-nitroaryl ether in a reasonable length of time. When 1.5 moles of alkali per mole of nitroaryl halide are employed, the time necessary to effect complete conversion to the ether will vary with the quantity of alcohol used due to the necessity of regulating the concentration of alkali. In general the total amount of alkali will range from 1.5 to 2.0 moles per mole of nitroaryl halide.

The process of our invention is preferably carried out at the temperature of reflux of the reaction mixture. Less preferably, the reaction may be carried out in the warm, say at a temperature of at least 80° C. but this is objectionable for various reasons among which is that it requires the use of temperature-controlling equipment. The refluxing temperature will vary somewhat depending upon the composition of the reaction mixture and it will also vary with pressure. However, it is preferred to carry out our process at substantially atmospheric pressure in order to simplify the process. Thus the reaction temperature usually is the temperature at which the temperature refluxes at atmospheric pressure. Refluxing of the mixture is accomplished simply by holding the reaction mixture at the boiling point and passing the vapors into the usual reflux condenser whence the liquid condensate is continuously returned to the boiling mixture.

The time of reaction employed in practicing our invention is preferably such as to effect substantially complete conversion of the nitroaryl halide to the alkyl-nitroaryl ether. The time necessary to complete the reaction will depend directly upon other reaction conditions such as alkali concentration, volume of alcohol used, etc. In practice the variables are preferably so adjusted that the reaction time does not exceed 24 hours. This shortened time of reaction, in marked contrast to prior processes requiring times of the order of 50 or more hours, is a very advantageous feature of our invention.

The reducing action of any acetaldehyde present in the alcohol may be sufficient to cause formation of undesired azoxy compounds. Destruction of acetaldehyde which may be present in the ethanol is accomplished by the use of a catalyst which in the presence of atmospheric air will oxidize acetaldehyde to acetic acid. In the case of alcohols other than ethanol, the corresponding aldehydes may be present and likewise are destroyed by the catalyst and the oxidizing action of the air in accordance with our invention. Any metallic compound which is capable of catalyzing acetaldehyde to acetic acid by gaseous oxygen may be employed. We prefer to use the compounds of metals selected from the group consisting of vanadium, chromium, manganese, iron, cobalt, nickel and uranium. The metallic naphthenates have proven to be exceedingly valuable for this purpose, an example being manganese naphthenate. An example of a uranium salt which was found to work well is uranium acetate. However in view of the difficulty of securing uranium compounds, we prefer to use compounds of the other metals enumerated which form a natural group, being the elements having atomic weights between 50 and 60 and being consecutively placed in the 4th Series of the Periodic System. Preference is given to compounds of manganese such as manganese dioxide, manganese sulfate, manganese naphthenate, etc. The most highly preferred catalysts are precipitated manganese dioxide in a 4% concentration and manganese naphthenate (10% Mn) in a 2% concentration, both concentrations being by weight based on the weight of the nitroaryl halide. Ground manganese dioxide ore has been found not to work as well as precipitated manganese dioxide. In general the amount of the catalyst employed may range from 0.5 to 5% by weight based on the weight of the nitroaryl halide.

The process of our invention may be carried out either batchwise or continuously. In a batchwise process, it is preferable to preliminarily reflux the reaction mixture comprising the alcohol, the catalyst and the initial portion of alkali metal hydroxide in the reaction zone while passing a stream of air or other suitable oxygen-containing gas through the refluxing mixture to effect preliminary removal of aldehyde from the reaction mixture. The nitroaryl halide may then be added, whereupon stirring and refluxing with introduction of a stream of air are recommenced and continued until the reaction is complete, alkali metal hydroxide being added in portions as indicated above. At the end of the reaction period, the alkyl-nitroaryl ether can be recovered simply by distilling off the alcohol which is recovered for reuse in a subsequent process and then steam distilling the residue to recover the alkyl-nitroaryl ether as the distillate. In the case of a continuous process any suitable means of continuously charging the reactants and catalyst to the reaction zone and continuously withdrawing reaction mixture therefrom may be employed.

As the oxidizing gas passed through the refluxing reaction mixture, we prefer to use air. However, we may use any other suitable oxygen-containing gas such as pure oxygen or any other gas containing oxygen and free from components which would interfere with the reaction or contaminate the reaction mixture. The rate at which the oxygen-containing gas is passed through the mixture should be sufficiently great to oxidize any aldehyde present to the acid and sufficiently great that the off-gas contains oxygen. The rate should not be so great that an excessive amount of alcohol is removed by volatilization from the reaction mixture or so great that the action of the reflux condenser is interfered with. The gas is introduced in any suitable manner effecting intimate contact with the reaction mixture, typically by bubbling through the agitated reaction mixture.

The following examples illustrate the preferred procedure for the practice of our invention.

*Example 1*

A mixture of 500 cc. of 95% ethanol, 10 g. NaOH and 3.2 g. manganese naphthenate (10% Mn) is stirred vigorously and refluxed for one hour while a stream of air is passed through the solution at such a rate that the condenser shows no tendency to flood. This procedure is employed to remove acetaldehyde from the reaction mixture.

At the end of this treatment, 157.5 g. (1 mole) p-chloronitrobenzene is added to the mixture and stirring and refluxing in the presence of a stream of air recommenced.

NaOH is added to the reaction mixture as it is consumed, 10 g. additions being made about every three hours to a total of 65 g. (the last portion added being only 5 g.), so that the concentration of NaOH does not greatly exceed 0.5 normal in the alcoholic solution. Completeness of reaction is achieved in 24 hrs., stirring being continued for about six hours after the last addition of alkali, and can be tested for by removing a sample, separating the p-nitrophenetole and determining the melting point and examining it for absence of chlorine. A good criterion for the completeness of the reaction is the weight of the sodium chloride formed which is insoluble in the reaction mixture and may be filtered off and weighed. The p-nitrophenetole can be isolated from the reaction mixture by distilling off the alcohol, steam-distilling the product from the residue either before or after neutralizing the excess alkali present. The yield of p-nitrophenetole was 95% based on p-chloronitrobenzene charged. Sodium nitro phenolate, formed to the extent of about 5% can be recovered in the residue following steam distillation.

*Example 2*

The procedure of Example 1 was duplicated except that 6.4 g. of precipitated manganese dioxide is used as a catalyst.

*Example 3*

A mixture of 500 cc. of 95% methyl alcohol, 10 g. NaOH and 3.2 g. manganese naphthenate (10% Mn) or 6.4 g. precipitated manganese dioxide is stirred vigorously and refluxed for one hour while a stream of air is passed therethrough as in Example 1. At the end of this treatment 157.5 g. p-chloronitrobenzene is added to the mixture and stirring and refluxing in the presence of the stream of air are recommenced. The reaction is conducted in the same manner as in Example 1. The p-nitroanisole can be isolated from the reaction mixture in a manner similar to that disclosed in Example 1. Yields of 95% or better are obtainable.

*Example 4*

The substitution in Example 1 of o-chloronitrobenzene leads to excellent yields of o-nitrophenetole.

By the use of the improved operating conditions disclosed herein it has been found possible to prevent completely the formation of any azoxy compound, for example, p,p'-dichlorazoxybenzene which may be the main product of the reaction of p-chloronitrobenzene with alcohol. Furthermore, by the use of the process of our invention a second side reaction namely the reaction of nitroaryl halide with alkali to form nitrophenol has been restricted. As a result, the formation of the alkyl-nitroaryl ether is favored with consequent higher yields of the desired material. Furthermore, the alkyl-nitroaryl ether produced by our invention is in such a good state of purity in the reaction product, due to freedom from side reaction products, that it can, if desired, be reduced to the amino compound without isolation except to remove excess alcohol. This is very advantageous when it is desired to make the amino compound, for example phenetidine from p-nitrophenetole in the manufacture of phenacetin.

While the original reaction mixture is described herein and in the claims as comprising essentially the named components, in practice it will almost invariably consist of those components.

Having thus described our invention, what we claim and desire to protect by Letters Patent is:

1. A process of preparing an alkyl-nitroaryl ether which comprises passing a stream of oxygen-containing gas into a refluxing reaction mixture comprising essentially a nitroaryl halide, an aliphatic monohydric alkyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said halide; and maintaining the concentration 2. A process of preparing an o-alkyl-nitrophenyl ether which comprises passing a stream of oxygen-containing gas into a refluxing mixture comprising essentially an o-nitrophenyl halide, an aliphatic monohydric alkyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said halide, and maintaining the concentration of said alkali metal hydroxide throughout at from 0.25 to 1.0 normal with respect to the alcohol and any water present, the initial concentration of said alcohol being at least 85% and substantially the only water present in the reaction mixture being that introduced by the alcohol and that formed by the reaction.

3. A process of preparing a p-alkyl-nitrophenyl ether which comprises passing a stream of oxygen-containing gas into a refluxing reaction mixture comprising essentially a p-nitrophenyl halide, an aliphatic monohydric alkyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said halide, and maintaining the concentration of said alkali metal hydroxide throughout at from 0.25 to 1.0 normal with respect to the alcohol and any water present, the initial concentration of said alcohol being at least 85% and substantially the only water present in the reaction mixture being that introduced by the alcohol and that formed by the reaction.

4. A process of preparing p-ethoxy nitrobenzene which comprises passing a stream of oxygen-containing gas into a refluxing reaction mixture comprising essentially p-chloronitrobenzene, ethyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said p-chloronitrobenzene, and maintaining the concentration of said alkali metal hydroxide throughout at from 0.4 to 0.6 normal with respect to the alcohol and any water present, the initial concentration of said alcohol being at least 85% and substantially the only water present in the reaction mixture being that introduced by the alcohol and that formed by the reaction.

5. A process of preparing o-ethoxy nitrobenzene which comprises passing a stream of oxygen-containing gas into a refluxing reaction mixture comprising essentially o-chloronitrobenzene, ethyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said o-chloronitrobenzene, and maintaining the concentration of said alkali metal hydroxide throughout at from 0.4 to 0.6 normal with respect to the alcohol and any water present, the initial concentration of said alcohol being at least 85% and substantially the only water present in the reaction mixture being that introduced by the alcohol and that formed by the reaction.

6. A process of preparing p-methoxy nitrobenzene which comprises passing a stream of oxygen-containing gas into a refluxing reaction mixture comprising essentially p-chloronitrobenzene, methyl alcohol, an alkali metal hydroxide and a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said p-chloronitrobenzene, and maintaining the concentration of said alkali metal hydroxide throughout at from 0.4 to 0.6 normal with respect to the alcohol and any water present, the initial concentration of said alcohol being at least 85% and substantially the only water present in the reaction mixture being that introduced by the alcohol and that formed by the reaction.

7. A process of preparing an ethyl-nitrophenyl ether which comprises passing a stream of oxygen-containing gas into a refluxing reaction mixture comprising essentially a mono-nitrophenyl halide, ethyl alcohol, an alkali metal hydroxide and a manganese compound capable of catalyzing the oxidation of acetaldehyde to acetic acid, said manganese compound being employed in amount ranging from 0.5 to 5% by weight based on said halide, and maintaining the concentration of said alkali metal hydroxide throughout at from 0.25 to 1.0 normal with respect to the alcohol and any water present, the initial concentration of said alcohol being at least 85% and substantially the only water present in the reaction mixture being that introduced by the alcohol and that formed by the reaction.

8. A process of preparing an alkyl-nitroaryl ether which comprises passing a stream of oxygen-containing gas into a refluxing reaction mixture comprising essentially a nitroaryl halide, an aliphatic monohydric alkyl alcohol in an amount ranging from 4.5 to 45 moles per mole of said halide, the initial concentration of said alcohol being at least 85%, an alkali metal hydroxide, and from 0.5 to 5% by weight based on said halide of a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said halide, and maintaining the concentration of said alkali metal hydroxide throughout at from 0.25 to 1.0 normal with respect to the alcohol and any water present, substantially the only water present in the reaction mixture being that introduced by the alcohol and that formed by the reaction.

9. A process of preparing an alkyl-nitroaryl ether which comprises passing a stream of oxygen-containing gas into a refluxing reaction mixture comprising essentially a nitroaryl halide, an aliphatic monohydric alkyl alcohol in an amount ranging from 8 to 10 moles per mole of said halide, the initial concentration of said alcohol being at least 85%, an alkali metal hydroxide and from 0.5 to 5% by weight based on said halide of a metallic compound capable of catalyzing the oxidation of acetaldehyde to acetic acid, said metallic compound being a compound selected from the group consisting of vanadium, chromium, manganese, iron, cobalt, nickel and uranium and being employed in amount ranging from 0.5 to 5% by weight based on the weight of said halide, establishing the initial concentration of said alkali metal hydroxide at from 0.4 to 0.6 normal with respect to the alcohol and any water present, and throughout the reaction maintaining the concentration of said alkali metal hydroxide at from 0.4 to 0.6 normal with respect to the alcohol and any water present by gradually adding alkali metal hydroxide as it is consumed, the total amount of alkali metal hydroxide being at least 1.5 moles per mole of alkali metal hydroxide per mole of nitroaryl halide, substantially the only water present in the reaction mixture being that introduced by the alcohol and that formed by the reaction.

10. A process of preparing p-ethoxy nitrobenzene which comprises refluxing at substantially atmospheric pressure while passing a stream of oxygen-containing gas therethrough a reaction mixture consisting essentially of p-chloronitrobenzene, ethyl alcohol in an amount ranging from 8 to 10 moles per mole of said p-chloronitrobenzene, said ethyl alcohol being present in an initial concentration of at least 85%, an alkali metal hydroxide, and from 0.5 to 5% by weight based on said p-chloronitrobenzene of manganese naphthenate, establishing the initial concentration of said alkali metal hydroxide at from 0.4 to 0.6 normal with respect to the ethyl alcohol and any water present, and throughout the reaction maintaining the concentration of said alkali metal hydroxide at from 0.4 to 0.6 normal with respect to said alcohol and any water present by gradually adding alkali metal hydroxide as it is consumed, the total amount of alkali metal hydroxide being equal to at least 1.5 moles per mole of said p-chloronitrobenzene, substantially the only water present in the reaction mixture being that introduced by the alcohol and that formed by the reaction.

11. The process of claim 10 wherein the mixture of ethyl alcohol, the initial portion of alkali metal hydroxide, and manganese naphthenate is preliminarily refluxed while passing said oxygen-containing gas therethrough to effect preliminary removal of acetaldehyde therefrom, whereupon the p-chloronitrobenzene is added and refluxing and passage of said gas are thereafter continued.

WALTER R. ASHFORD.
ROBERT W. BEATTIE.

REFERENCES CITED

The following references are of record in the file of this patent:

UNITED STATES PATENTS

| Number | Name | Date |
|---|---|---|
| 1,619,368 | Pratt | Mar. 1, 1927 |
| 2,166,917 | McCormack | July 18, 1939 |
| 2,370,524 | Denison | Feb. 27, 1945 |

FOREIGN PATENTS

| Number | Country | Date |
|---|---|---|
| 154,304 | Great Britain | Nov. 22, 1920 |

OTHER REFERENCES

Richardson: "Jour. Chem. Soc." (London), 1926, pages 522–529.

Aoyamo et al.: "Jour. Pharm. Soc. Japan," vol. 53, pages 613–634 (1933), Abstracted in Chem. Abs., vol. 28, pages 140, 141.

Govindachari et al.: "Jour. Sci. and Ind. Research" (India), vol. 4, (1945), pages 369–74, Abstracted in Chem. Abs., vol. 40, page 6448.

Dey et al.: "Chem. Abstracts," vol. 41 (1947), col. 2407b, Abstract of article in "Jour. Sci. and Ind. Research" (India), vol. 1B (1946) pages 25–28.

Dey: "Chem. Abstracts," vol. 43 (1949), col. 687gi, Abstract of Indian Patent 33,473 issued Feb. 18, 1948, and Indian Patent 34,411 issued Apr. 21, 1948.